United States Patent [19]

Moormann

[11] Patent Number: 5,107,297
[45] Date of Patent: Apr. 21, 1992

[54] APPARATUS AND METHOD FOR PHOTOCOPYING X-RAYS

[76] Inventor: Andrew J. Moormann, 9132 Windsor Dr., Palos Hills, Ill. 60465

[21] Appl. No.: 661,911
[22] Filed: Feb. 27, 1991
[51] Int. Cl.$^5$ ....................... G03B 27/48; G03B 27/50
[52] U.S. Cl. ......................................... 355/50; 355/77
[58] Field of Search ....................... 355/50, 51, 46, 43, 355/75, 77

[56] References Cited

U.S. PATENT DOCUMENTS 4,111,540  9/1978  Bollman .......................... 355/75 X
4,360,265 11/1982  Lewis ................................. 355/43

Primary Examiner—Richard A. Wintercorn
Attorney, Agent, or Firm—Juettner Pyle & Lloyd

[57] ABSTRACT

The apparatus of the invention comprises a conventional photocopy machine having a stationary light receiving device and a moving copyboard in combination with a light fixture attachment. The light fixture comprises an elongated lamp and a support for holding the lamp above the copier and aligned with the stationary image receiving device. The support comprises a base which is positioned under the copier, a vertical leg attached to the base, and a horizontal arm pivotally connected to the vertical leg. The lamp is secured to the horizontal arm. The pivotal connection of the horizontal arm to the vertical leg permits the lamp to be pivoted to and from a position above the copyboard. The lamp when pivoted over the copyboard is aligned with the light receiving device of the copier. Thus, when a radiograph is placed on the copyboard, light emitted from the lamp passes through the radiograph and copyboard and is received by the image receiving device of the copier. The additional light from the lamp of the invention, directed through the radiograph, greatly enhances the quality of xerographic reproduction of the radiograph.

20 Claims, 3 Drawing Sheets

5,107,297

APPARATUS AND METHOD FOR PHOTOCOPYING X-RAYS

BACKGROUND OF THE INVENTION

The present invention relates generally to photocopy apparatus, and more specifically to apparatuses and methods for making photocopies of x-rays, especially dental radiographs.

It is often desirable to duplicate dental radiographs. For example, many insurance companies require originals or duplicates of radiographs in processing claims made on dental insurance policies. Dentists may send their radiographs out to a film laboratory to have photographic reproductions made. This entails delays and not insubstantial cost.

Alternatively, dentists may send their original radiographs to insurance companies. That, however, leaves the dentist without the benefit of the radiograph for a period of time. In addition, as is wont to happen, the radiograph may become lost, misplaced or damaged in transit or handling.

It would be desirable to have a device for making copies of radiographs. Photocopies are particularly desirable, as they are quick and inexpensive. If it is lost or damaged, being a copy, it is no loss. Although photocopy quality is generally insufficient for diagnosis purposes, it is often quite adequate for insurance purposes, especially pre-estimates.

Most commercially available photocopy machines, however, are not suitable for making photocopies of radiographs. Attempts at photocopying often results with an illegible dark smudge, rather than a clear copy.

It is therefore the object of the present invention to develop a device that will permit clear, legible xerographic reproduction of x-rays, especially dental radiographs. It is a further object of the invention to provide an x-ray photocopy device that may be attached to an existing photocopy machine, and that is inexpensive and easy to operate.

SUMMARY OF THE INVENTION

The foregoing objects have been most satisfactorily achieved with applicant's XRL ™ light base in combination with a conventional photocopy machine. The apparatus of the invention is adapted to be attached to an existing photocopy machine of the type having an elongated stationary image receiving device, e.g., fiber lens, and moving copyboard.

The apparatus of the invention comprises an elongated lamp and a support for holding the lamp above and aligned with the stationary image receiving device of the copier. The support comprises a base which is positioned under the copier, a vertical leg attached to the base, and a horizontal arm pivotally connected to the vertical leg. The lamp is secured to the horizontal arm. The pivotal connection of the horizontal arm to the vertical leg permits the light to be pivoted to and from a position above the copyboard.

The lamp when pivoted over the copyboard is aligned with the light receiving aperture or fiber lens of the copier. Thus, when a radiograph is placed on the copyboard, light emitted from the lamp passes through the radiograph and copyboard and is received by the aperture or fiber lens of the copier. The additional light from the lamp of the invention, directed through the radiograph greatly enhances the quality of xerographic reproduction of the radiograph. The copy is made quickly since the x-rays film need not be removed from the holder or mount. Furthermore, since the existing light source of the photocopier has not been disabled, notations appearing on the opaque x-ray holders and mounts are reproduced in the normal manner. Thereby, satisfactory copies of radiographs with holder notations are quickly and easily made. Moreover, since the existing photocopy machine has not been materially altered, it may continue to function as an office copier. Further objects and advantages of the present invention will become apparent when read in conjunction with the accompanying drawings.

DETAILED DESCRIPTION

Figure 1:
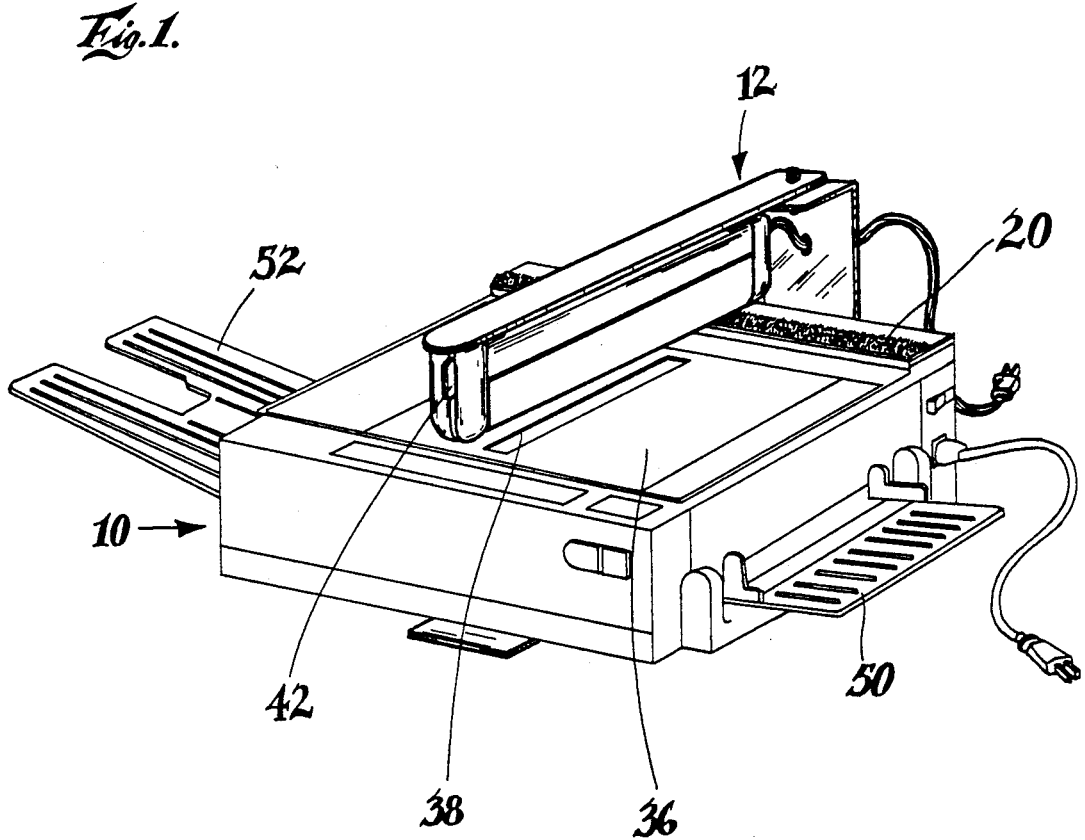
FIG. 1 is a perspective view of apparatus of the invention showing the light source positioned for copying radiographs.
Figure 2:
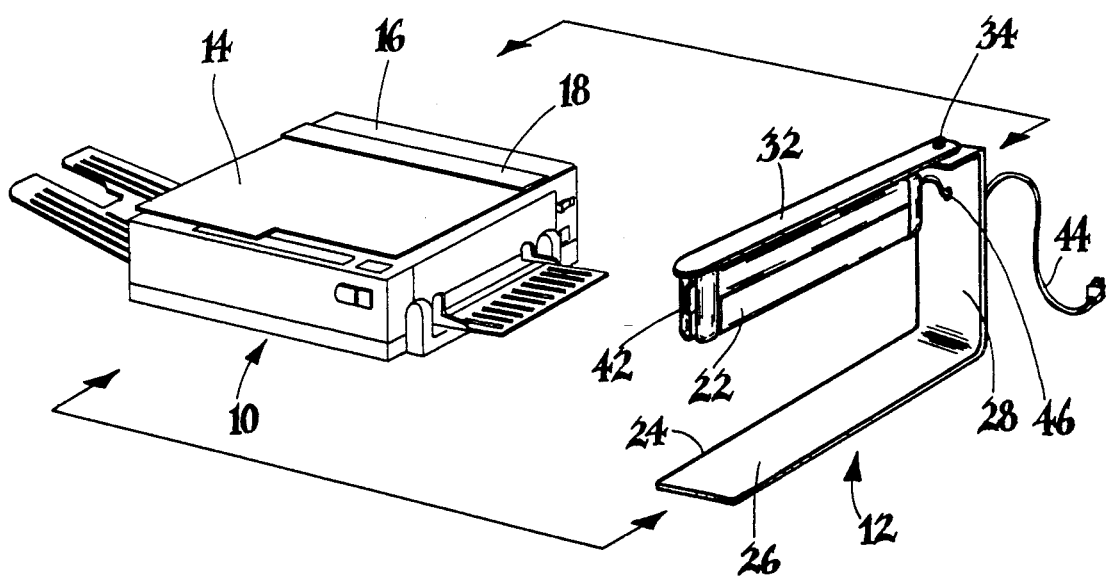
FIG. 2 is an exploded perspective view showing the photocopier, and light fixture of the invention.
Figure 3:
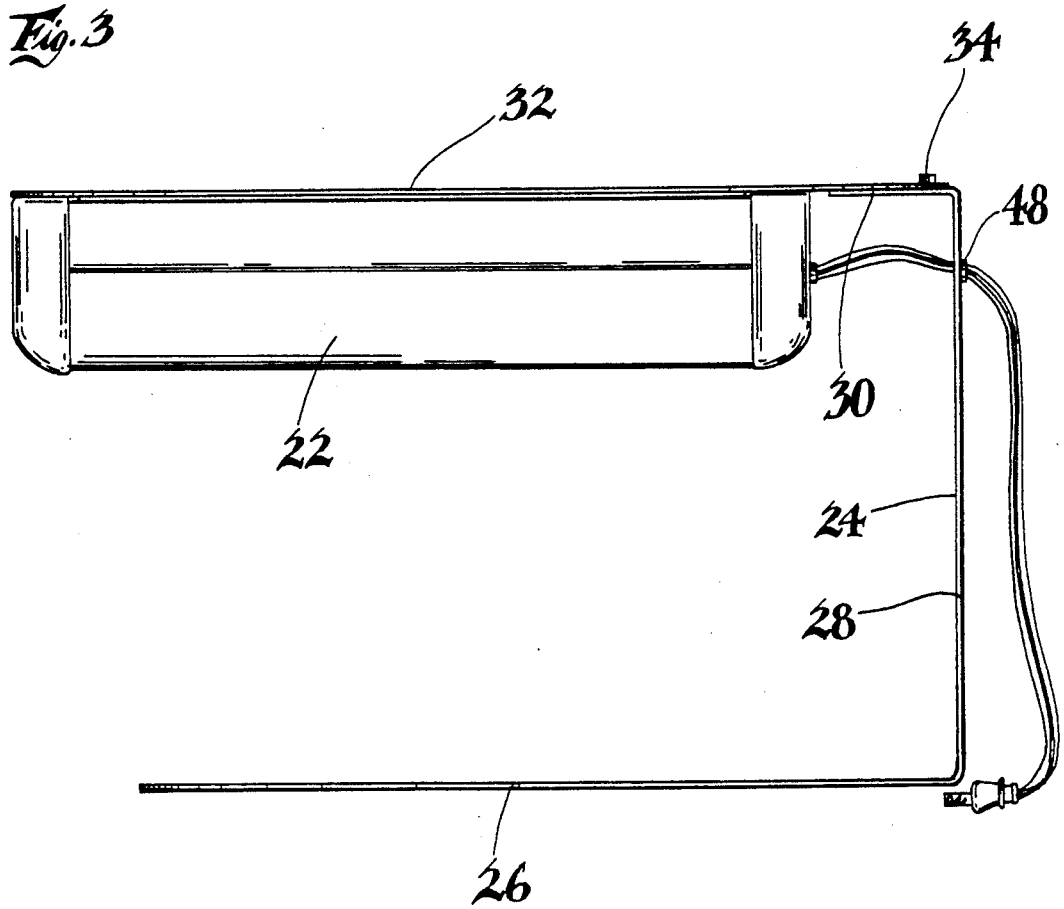
FIG. 3 is a side elevational view of the light fixture of the invention.
Figure 4:
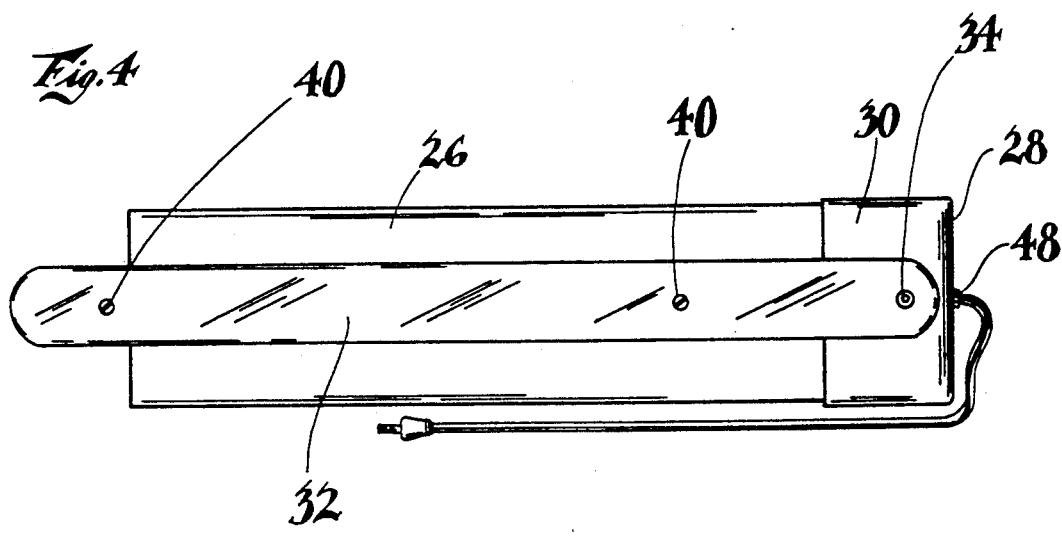
FIG. 4 is a top plan view of the light fixture of the invention.

Turning now to the drawings, FIGS. 1 and 2 illustrate a photocopier 10 and the light fixture 1 of the invention. The photocopier 10 may be any one of a variety of commercially available photocopiers having a stationary image receiving device and moving copyboard. Applicant has successfully used Canon ® PC 1, 2, 3 and 5 copiers and the Ricoh LR1 copier. Copiers of other manufacturers may be suitable as well. The Canon ® PC-3II copier is generally preferred.

The Canon PC-3II copier is made with a copyboard cover 14 which is hingedly connected to the copier housing 16. The hinge 16 consists of a flexible plastic member. To utilize the light fixture 12 of the invention it is necessary to remove the copyboard cover 14. This is accomplished by cutting the plastic hinge with a utility knife or the like. Since it is desirable to continue to utilize the unit in its normal photocopy mode, the hinge is preferably replaced with a removable fabric hinge 18. The fabric hinge may be formed of hook and loop tape, e.g., Velcro ®. The fabric hinge 18 comprises two mating portions, namely, a pile or loop fabric portion and a hook portion. The hook potion is divided longitudinally into two strips. One hook strip is fastened with adhesive to the upper surface of an edge of the copyboard 14. The other hook strip 20 is similarly fastened to the copier housing 16 juxtaposed to the first strip. The mating loop portion may then be removably joined to both hook strips, bridging the original cut hinge, and thereby forming the aforementioned removable fabric hinge 18.

The light fixture 12 of the invention comprises a lamp 22 and a support 24. The support 24 comprises a base 26, a vertical leg 28, a flange 30, and a horizontal arm 32. The base 26 is sufficiently wide to provide stability, and is sufficiently thin to be slid under the copier 10. The base 26, vertical leg 28 and flange 30 are preferably unitary and may be fabricated by bending strip of metal stock. Alternatively, it may be molded from plastic. The horizontal arm 32 is pivotally connected to flange 30 with a pivot pin 34. The pivot pin may comprise a bolt, washer and nut. The horizontal arm 32 may be fabricated from metal stock or may be molded from plastic.

The support 24, and in particular leg 28, is sized to support lamp 22 approximately 3 cm (1¼ inches) above the copyboard 36 of the copier 10. The distance of 3 cm between the lamp and copyboard has been found to be the optimum distance when using an 8 watt fluorescent lamp.

The lamp 22 is preferably a commercially available 8 watt fluorescent light fixture. The length of the lamp should be sufficient to cover the light receiving device 38 of the copier 10. A standard twelve inch fluorescent lamp has been found to be sufficient to cover the fiber lens of a Canon PC copier.

The lamp 22 is fastened in any conventional manner to horizontal arm 32. Two screws 40 are sufficient.

Lamp 22 is preferably provided with a switch 42 for activating/deactivating the lamp. A power cord 44 for the lamp is provided for connection to standard 110 volt AC outlet. The vertical leg 28 includes an opening 46 for receiving the power cord 44. The opening is preferably fitted with a plastic grommet 48 to protect the cord 44 from chaffing.

The apparatus of the invention is operated as follows. The base 26 of light fixture 12 is slid under the photocopier 10 so as to position the lamp 22 above the mid-portion of the copier transverse to the longitudinal movement of the copyboard. For ordinary photocopy functions, the light unit is pivoted away from the copyboard. To copy a radiograph, the copyboard cover 14 must first be removed. The loop strip of fabric hinge 10 is separated from the corresponding hook strips to detach the copyboard cover. Next, the horizontal arm 32 of the light support is pivoted to position the lamp 22 over the light receiving aperture 38 of copier 10. Then, the switch 42 may be toggled to energize lamp 22. The copier 10 should also be turned on. When the copier indicators indicate that the copier is ready for operation, a dental radiograph to be copied is placed front side down on the copyboard 36. A single sheet of suitable copy paper is then inserted into the paper receiving tray 50. In approximately ten seconds, the finished copy is delivered to copier output tray 52. Copy intensity may be adjusted as with normal photocopying to compensate for varying densities of x-rays.

The copier may be returned to its original operating condition by pivoting the lamp away from the copyboard 36, and re-installing the copyboard cover 14 with the Velcro fabric hinge 18.

In performing the copying function, the x-ray film need not be removed from holders or mounts, thereby saving time. Since the existing light source of the copier is not disabled all notations on the x-ray holders and mounts are reproduced as well as the radiograph per se. This makes the resulting product quite useful for insurance pre-estimates.

It is to be understood that while the preferred embodiment of the invention has been described in detail, various modifications and other embodiments thereof may be devised by one skilled in the art without departing from the spirit and scope of the invention, as defined in the appended claims.

What is claimed is:

1. An apparatus for photocopying radiographs and the like, comprising:
   a photocopier having a stationary image receiving means for receiving an image to be photocopied extending in a transverse direction and a transparent copyboard for receiving a radiograph to be photocopied, said copyboard adapted to move in a longitudinal direction; and
   an elongated illumination means above said copyboard aligned with said image receiving means for directing light through said radiograph and copyboard to said image receiving means.

2. An apparatus as in claim 1, further comprising means for supporting said illumination means above said copyboard.

3. An apparatus as in claim 2, wherein said supporting means comprises a base, a vertical leg attached to said base and a horizontal arm connected to said vertical leg, and wherein said illumination means is attached to said horizontal arm.

4. An apparatus as in claim 3, wherein said horizontal arm is pivotally connected to said vertical leg, whereby said light source may be pivotally moved over and away from said copyboard.

5. An apparatus as in claim 3, further comprising a horizontal flange attached to the upper end of said vertical leg.

6. An apparatus as in claim 5, wherein said base, vertical leg and horizontal flange are a unitary member.

7. An apparatus as in claim 5, further comprising a pivot pin pivotally connecting said horizontal arm to said horizontal flange.

8. An apparatus as in claim 1, wherein said illumination means comprises a fluorescent light.

9. An apparatus as in claim 8, wherein said fluorescent light is about 8 watts.

10. An apparatus as in claim 1, wherein said illumination means is spaced substantially 1¼ inches above said copyboard.

11. An apparatus as in claim 1, further comprising switch means for activating and deactivating said illumination means.

12. An apparatus as in claim 1, further comprising a cover for covering said copyboard and a means for removably and hingedly connecting said cover to said photocopier.

13. An apparatus as in claim 12, wherein said means for removably and hingedly connecting said cover comprises hook and loop tape, said tape have two mating portions, one portion of said tape comprising two longitudinal strips, one of said strips attached to an edge of said cover and the other said strip attached to said photocopier juxtaposed to said first strip, and said second mating portion removably joined to both of said first and second strips of said first mating portion.

14. An illumination apparatus for attachment to a photocopier for photocopying radiographs and the like, the photocopier having a stationary, elongated image receiving means for receiving an image to be photocopied extending in a transverse direction and a transparent copyboard adapted to move in a longitudinal direction, said illumination apparatus comprising:
   (a) an elongated means for illumination; and
   (b) support means attached to said illumination means for supporting said illumination means above the copyboard and aligned with the image receiving means of the photocopier, whereby light from said illumination means may pass through the radiograph and the copyboard and be received by the image receiving means.

15. An apparatus as in claim 14, wherein said means for support comprises a base, a vertical leg and a horizontal arm, and wherein said illumination means is attached to said horizontal arm.

16. An apparatus as in claim 15, wherein said horizontal arm is pivotally connected to said vertical support.

17. A method for making photocopies of a radiograph using a photocopier having a stationary elongated image receiving means and a transparent copyboard, comprising the steps of:
(a) placing a radiograph on the copyboard;
(b) casting illumination substantially uniformly across the transverse width of and through the radiograph, through the copyboard, and to the image receiving means; and
(c) activating the photocopier to move the copyboard carrying the radiograph in a longitudinal direction and to thereby make a photocopy of the radiograph.

18. The method of claim 17, wherein the casting illumination step is performed by positioning a light source above the copier, aligning the light source with the image receiving means of the photocopier, and activating the light source to cast illumination through the radiograph and the copyboard and into the image receiving means.

19. A method for making photocopies of a radiograph using a photocopier having a transparent copyboard, a copyboard cover and a stationary, elongated image receiving means, comprising the steps of:
(a) detaching the copyboard cover from the photocopier;
(b) placing a radiograph on the copyboard of the photocopier;
(c) pivotally moving a light source over the photocopier;
(d) aligning the light source with the image receiving means of the photocopier;
(e) activating the light source to cast illumination substantially uniformly across the transverse width of and through the radiograph, through the copyboard and to the image receiving means; and
(f) activating the photocopier to move the copyboard carrying the radiograph in a longitudinal direction and to thereby make a photocopy of the radiograph.

20. The method of claim 19, further comprising the steps of:
(g) pivoting the light source away from the copyboard; and
(h) re-attaching the copyboard cover to photocopier.

* * * * *